(12) United States Patent
Graf et al.

(10) Patent No.: US 12,435,656 B2
(45) Date of Patent: Oct. 7, 2025

(54) METHOD AND DEVICE FOR DIAGNOSING AN AIR SUPPLY OF AN INTERNAL COMBUSTION ENGINE

(71) Applicant: Robert Bosch GmbH, Stuttgart (DE)

(72) Inventors: Benedikt Graf, Ludwigsburg (DE); Christian Disch, Wimsheim (DE); Conrad Bubeck, Esslingen (DE); Markus Deissler, Heilbronn (DE); Stefan Bauer, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/536,366

(22) Filed: Dec. 12, 2023

(65) Prior Publication Data

US 2024/0191646 A1  Jun. 13, 2024

(30) Foreign Application Priority Data

Dec. 13, 2022 (DE) .................... 10 2022 213 543.1

(51) Int. Cl.
*F01N 11/00* (2006.01)
*F01N 3/22* (2006.01)
*F01N 9/00* (2006.01)

(52) U.S. Cl.
CPC ............ *F01N 11/002* (2013.01); *F01N 3/225* (2013.01); *F01N 9/00* (2013.01); *F01N 2560/06* (2013.01); *F01N 2900/1804* (2013.01)

(58) Field of Classification Search
CPC .......... F01N 11/002; F01N 3/225; F01N 9/00; F01N 2560/06; F01N 2900/1804; F01N 2550/14
See application file for complete search history.

(56) References Cited

U.S. PATENT DOCUMENTS

| | | | |
|---|---|---|---|
| 5,412,943 A * | 5/1995 | Hosoya ................. | F01N 11/002 60/276 |
| 2004/0020189 A1* | 2/2004 | Hirooka .................. | F01N 3/303 60/284 |
| 2009/0265074 A1* | 10/2009 | Heinrich ............... | G01M 3/025 73/40.7 |

(Continued)

FOREIGN PATENT DOCUMENTS

DE    19508013 C1    3/1996

*Primary Examiner* — Matthew T Largi
(74) *Attorney, Agent, or Firm* — NORTON ROSE FULBRIGHT US LLP

(57) ABSTRACT

A method and a device for diagnosing an air supply of an internal combustion engine which includes a first air duct for supplying air to a cylinder and a second air duct for supplying air to a heater for heating an exhaust system. The first and second airs ducts each have a mass flow sensor for measuring a mass of the air flowing therethrough, a pressure sensor for measuring the pressure in the air duct, and a temperature sensor for measuring the temperature of the air flowing therethrough. The first and second air ducts originate from a common air filter. Depending on operating states of the cylinders and heater, measured values of the mass flow sensors, pressure sensors, and temperature sensors of the first and second ducts are compared with one another or with comparison values, and a result of the diagnosis is ascertained depending on the comparison.

12 Claims, 1 Drawing Sheet

(56) References Cited

U.S. PATENT DOCUMENTS

| | | | |
|---|---|---|---|
| 2015/0361855 A1* | 12/2015 | Görgen | F01N 3/323 |
| | | | 60/303 |
| 2020/0271046 A1* | 8/2020 | Kelly | F02B 37/10 |
| 2023/0258117 A1* | 8/2023 | Zhang | F01N 11/00 |
| | | | 701/29.4 |
| 2024/0191645 A1* | 6/2024 | Graf | F01N 11/00 |

* cited by examiner

METHOD AND DEVICE FOR DIAGNOSING AN AIR SUPPLY OF AN INTERNAL COMBUSTION ENGINE

CROSS REFERENCE

The present application claims the benefit under 35 U.S.C. § 119 of German Patent Application No. DE 10 2022 213 543.1 filed on Dec. 13, 2022, which is expressly incorporated herein by reference in its entirety.

FIELD

The present invention is based on a method and a device for diagnosing an air supply of an internal combustion engine.

BACKGROUND INFORMATION

German Patent No. DE 195 08 013 C1 describes an air supply of an internal combustion engine in which a first air duct and a second air duct are provided. Through the first air duct, air is supplied to cylinders of the internal combustion engine. Through a second air duct, air is supplied to a heater for heating an exhaust system of the internal combustion engine.

SUMMARY

A method according to the present invention and a device according to the present invention for diagnosing an air supply of an internal combustion engine may have an advantage that an improved and more accurate diagnosis of the air supply takes place. Due to the common air filter, the measurement signals of the sensors in the first and second air ducts influence each other, which is used for a diagnosis depending on operating states of the internal combustion engine. A mutual plausibility check and checking of the measured signals and thus a diagnosis of the entire air system can thus be carried out. In particular, leakages in the air supply, i.e., undesired ingress of air from the environment of the internal combustion engine into the air supply of the internal combustion engine, can thus be detected very reliably. The operational reliability of internal combustion engines is thus significantly increased.

Further advantages and improvements result from the features of the present invention. According to an example embodiment of the present invention, a particularly simple diagnosis takes place by a simple comparison of the pressure signals of the first and second air ducts. This comparison can be carried out for all operating states of the internal combustion engine. One operating state of the internal combustion engine and the air supply consists in that the throttle valve is opened and air is thus supplied to a cylinder of the internal combustion engine for the combustion of fuel. A further operating state of the internal combustion engine consists in that by activating an air pump and opening a shut-off valve in the second air duct, operation of a heater of the exhaust system of the internal combustion engine is activated. During operation of the internal combustion engine without heating, different sensor signals can expediently be compared with one another. By comparing the pressure signals of the first and second air ducts with a threshold value depending on an operating point of the internal combustion engine, a leak of the first or second air duct relative to the ambient air can be determined. By measuring the mass flow sensor in the second duct and comparing it with a threshold value, a leak in the second air duct relative to the ambient air can be determined. By measuring the temperature values of the temperature sensors of the first and second ducts and comparing them with each other, a leak in the second air duct relative to ambient air is determined if the temperature difference is greater than a threshold value. If the cylinders of the internal combustion engine are not supplied with air and only the heater of the exhaust system is operated, other sensor signals can expediently be evaluated. Through a mass flow of the air mass sensor in the first duct and comparison with a threshold value, a leak in the first air duct can be determined. By measuring the temperature values of the temperature sensors of the first and second air ducts and comparing these measurements to each other, a leak in the first air duct relative to ambient air is determined if the temperature difference is greater than a threshold value.

BRIEF DESCRIPTION OF THE DRAWINGS

Exemplary embodiments of the present invention are illustrated in the figures and explained in more detail in the description.

FIG. 1 shows an air system in which air is supplied to cylinders of the internal combustion engine and a heater of the exhaust system is not switched on.

FIG. 2 shows an air system of an internal combustion engine in which no air is supplied to the cylinders of the internal combustion engine, and a heater for heating the exhaust gas system of the internal combustion engine is switched on.

DETAILED DESCRIPTION OF EXAMPLE EMBODIMENTS

Figure 1:
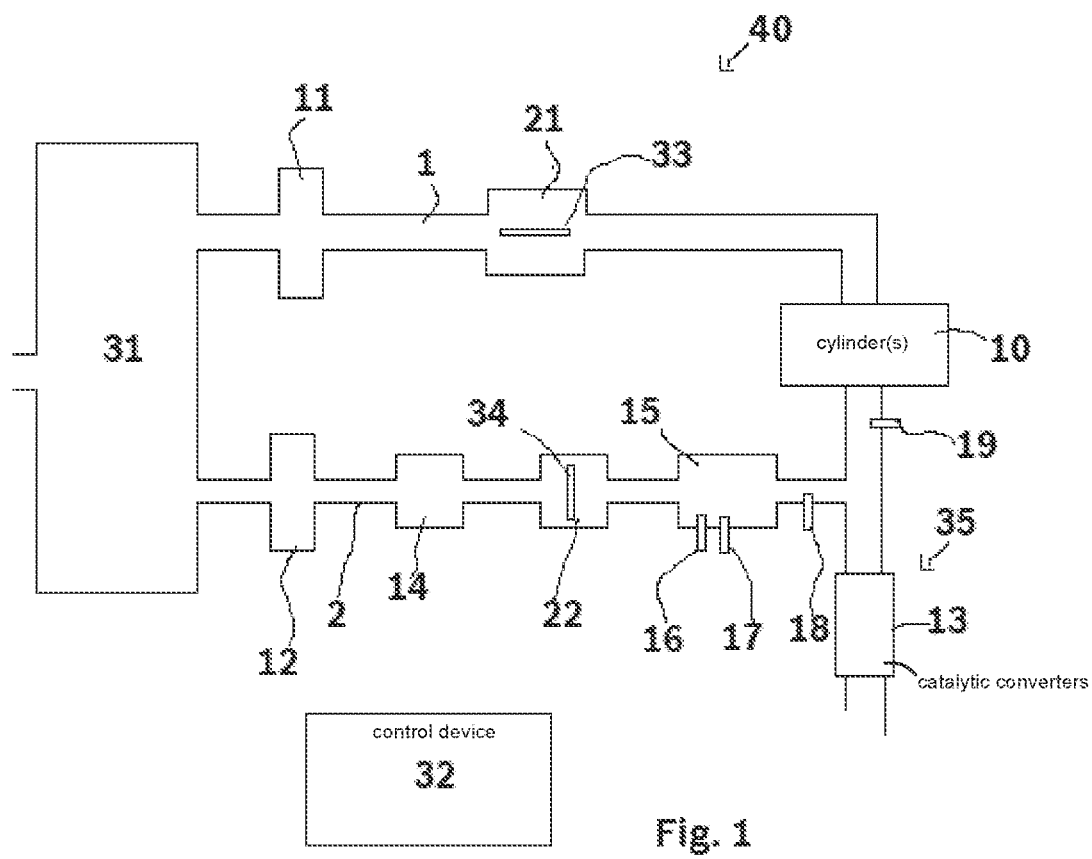

FIG. 1 schematically shows an internal combustion engine 40 with an air supply with a first air duct 1 and a second air duct 2. The air duct 1 connects an air filter 31 to one or more cylinders 10 of the internal combustion engine 40. The air duct 2 connects the air filter 31 to an exhaust gas heater 15.

In the first air duct 1, starting from the air filter 31 there are arranged first a sensor element 11, then a throttle valve 21, and then at least one cylinder 10. In the second air duct 2, starting from the air filter 31 there are arranged a sensor element 12, an air pump 14, a shut-off valve 22, and then a heater 15.

The two sensor elements 11, 12 each have a mass flow sensor, a pressure sensor, and a temperature sensor. The mass flow sensors measure the mass of air that flows through the relevant air duct 1, 2. The pressure in the air ducts 1, 2 is measured in each case by pressure sensors. The temperature of the air flowing through the air ducts 1, 2 is measured in each case by the temperature sensors.

The mass flowing through the air duct 1 is controlled by the throttle valve 21. For this purpose, a valve flap 33 is actuated in such a way that it controls the air flow. FIG. 1 schematically shows a position of the valve flap 33 parallel to the air flow or laminar to the air flow, which represents a maximally open valve flap 33 and thus maximum air flow through the air duct 1. However, the valve flap 33 can also assume intermediate positions by means of which the amount of air that is sucked in by the cylinders 10 of the internal combustion engine is controlled.

The amount of air flowing through the air duct 2 is determined by the air pump 14 and the shut-off valve 22. Only when the air pump 14 is switched on is a negative pressure generated which leads to a flow in the second air duct 2. Furthermore, the amount of air flowing through the air duct 2 can be influenced depending on the position of a valve flap 34 of the shut-off valve 22. The amount of air can be influenced by the delivery rate of the air pump 14 and the position of the valve flap 34. In a particularly simple embodiment, the valve flap 34 can only assume the completely open position or the completely closed position, and the air quantity is controlled only by the delivery rate or rotational speed of the air pump 14. In the representation in FIG. 1, the valve flap 34 is arranged transversely to the air flow, which corresponds to a closed shut-off valve 22. In the representation in FIG. 1, no air flow through the air duct 2 toward the heater 15 is thus provided.

The cylinders 10 and the heater 15 are each connected to an exhaust system 35 so that the exhaust gases of the cylinders 10 and of the heater 15 are routed through the exhaust system. Catalytic converters 13 and at least one lambda sensor 19 are provided in the exhaust system 35. The catalytic converters 13 may have a plurality of partial catalytic converters, for example a first and a second three-way catalytic converter, a particle filter, and a catalytic converter for NOx reduction. The precise function and arrangement of the partial catalytic converters is not important for understanding the present invention. The re-sidual oxygen content in the exhaust gas of the cylinders 10 is determined by the lambda sensor 19. It can thus be ensured that the total quantity of fuel introduced into the cylinders 10 is in a stoichiometric ratio to the introduced air, since only in such an operating range is good cleaning of the exhaust gas ensured.

The heater 15 further comprises a fuel injector 16 and an igniter 17. The fuel injector 16 is designed as a conventional fuel injection valve and enables a precisely defined quantity of fuel to be introduced into the heater 15 for a heating operation. The igniter 17 is typically designed as a normal spark plug or as a glow plug for igniting a fuel/air mixture. A further lambda sensor 18 is also arranged in the connecting pipe between the heater 15 and the exhaust system 35, by means of which further lambda sensor it can be ensured that the quantity ratios of air and fuel in the heater 15 also correspond to a stoichiometric combustion.

For controlling and diagnosing the device according to FIG. 1, a control device 32 is provided which (via lines not shown here) receives signals from all sensors and sends signals for controlling all control elements. The control device 32 processes the sensor signals and calculates control signals for the control element. Accordingly, the diagnostic functions described below are executed by the control device 32. The control device 32 can also be a part of a large control device which can be a wide va-riety of control tasks for the operation of the internal combustion engine or of a vehicle in which the internal combustion engine is installed.

FIG. 1 shows an operation in which the exhaust system 35 is sufficiently heated and therefore no heating is provided by the heater 15. This is always the case when the internal combustion engine has been in operation for a while and the hot exhaust gases from the cylinders 10 ensure sufficient heating of the exhaust system 35. In such an operating phase, a flow through the air duct 2 is then completely prevented by closing the shut-off valve 22 and switching off the air pump 14.

Typically, the heater is switched on before the internal combustion engine is started or during an early operating phase of the internal combustion engine. For example, the start of an internal combustion engine can be delayed and initially only an operation of the heater 15 take place. A heating of the exhaust system 35 is thus already achieved before the start of an internal combustion engine. As a result of this measure, cleaning of the exhaust gas is already enabled in early operation of the internal combustion engine, since it is not necessary to wait until the exhaust gases of the cylinders 10 reach the operating temperature of the catalytic converters 13 in the exhaust system 35. A start of the internal combustion engine is therefore delayed for a short time (for example 3 seconds) in order to ensure a minimum temperature of the exhaust system at startup of the internal combustion engine. Typically, a further operating phase is then carried out in which the internal combustion engine is already being operated by combustion processes in the cylinders 10 and, at the same time, heating by the heater 15 is also taking place. A further rapid heating of the exhaust system 35 up to an optimal operating temperature of the catalytic converters 13 is thereby ensured. In a further continuous operation of the combustion in the cylinders 15, it is possible for the heater 15 then not to be operated further. If operating phases occur with insufficient heat introduction into the exhaust system 35 during further operation of the internal combustion engine, the heater 15 can be activated again.

The two air ducts 1, 2 of FIG. 1 each originate from the same air filter 31. Due to this common air filter 31, the two flows through the air duct 1 and the air duct 2 influence one another, i.e. there is crosstalk of the respective measured signals in the sensor elements 11, 12. This crosstalk makes accurate control of the air flows in the air ducts 1, 2 more difficult. However, the crosstalk also enables a diagnosis when the signals of the sensor elements 11, 12 are compared with one another.

FIG. 1 shows an operation of the internal combustion engine in which combustion takes place in the cylinders 10 and no combustion takes place in the heater 15. In such operation, a diagnosis with regard to leakages or leaks of the air system can take place.

In a diagnosis, the pressure signals of the pressure sensor in air duct 1 and the pressure sensor in air duct 2 are measured and each compared with an expected value that depends on the operating parameters of the internal combustion engine. Typical operating parameters which determine the threshold value are a rotational speed or load of the internal combustion engine. If there is a leak in the air duct 2 or in the air duct 1, the measured pressure values deviate from the expected value by more than a threshold, and a diagnostic signal is accordingly generated. A leak in the air filter 12 through which additional air is sucked in, for example bypassing the air filter 12, can also be determined in this way.

A further diagnosis uses the mass flow sensor in the air duct 2. Since the shut-off valve 22 is closed, there should be no air flow in the air duct 2. However, if there is a leak in the air duct 2 a certain amount of air flows into the air duct 1 via the sensor element 12 and is measured accordingly. A measured mass flow of the sensor element 12 despite a closed shut-off valve 22 thus indicates a leak in the air duct 2.

Such a leak in the air duct 2 can also be detected by measuring the temperature in the air duct 1 and air duct 2. If air flows through the air duct 2 in the direction of the filter 31 due to a leak, this air flow may be heated more than air sucked in through the air filter 31, due to the spatial proximity of this air flow to the internal combustion engine. If the measured temperature in the air duct 2 is higher than the measured air temperature in the air duct 1, a leak in the air duct 2 can be detected.

Figure 2:
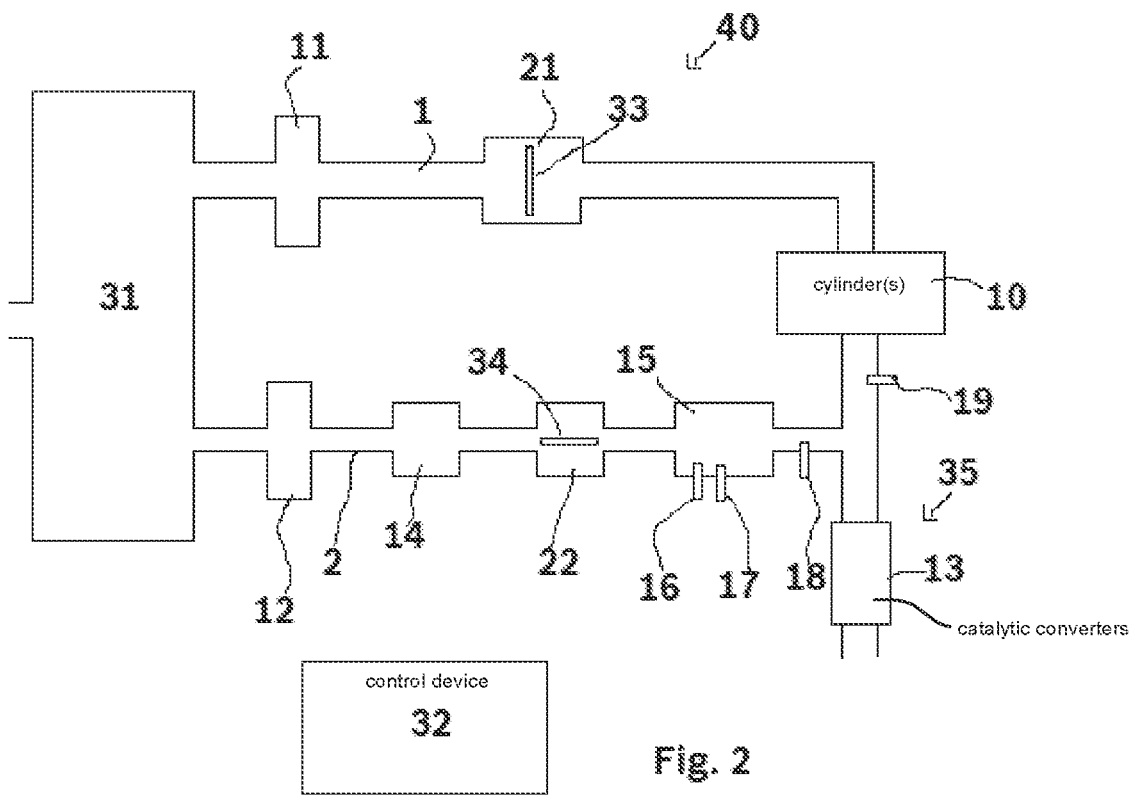

FIG. 2 shows an internal combustion engine 40 with all elements, as has already been described for FIG. 1. In contrast to FIG. 1, however, the valve plate 33 of the throttle valve 21 is shown closed and the valve plate 34 of the shut-off valve 22 is shown open. FIG. 2 thus shows an operating state in which the cylinders 10 of the internal combustion engine are not in operation and thus no air is flowing through the air duct 1 to the cylinders 10. In contrast, the shut-off valve 22 is open and the air pump 14 is activated. This operating state thus corresponds to a heating of the exhaust system 35 with no combustion taking place in the cylinders 10. This is the case, for example, in an upstream heating operation of the exhaust system 35 before the internal combustion engine is started, for example during a cold start.

The operation of the internal combustion engine as shown in FIG. ure 2 also enables a diagnosis due to the crosstalk of the signals of the sensor elements 11, 12.

A first diagnosis takes place in FIG. 2 by evaluating the mass flow in the air duct 1. No mass flow is actually to be expected due to the closed throttle valve 21. If a mass flow of air (into the air filter 31) is nevertheless measured by the sensor element 11, a leak in the air duct 1 is diagnosed.

A second diagnosis can in turn take place by evaluating the temperature in the air duct 1 and air duct 2. If the air duct 1 has a leak, the air sucked in thereby can be significantly warmer than fresh air which is sucked in from the surroundings through the filter 31. If a temperature difference of the air in the air duct 1 and air duct 2 is thus determined, this is an indication of a leak in the air duct 1. A leak in the air duct 1 can also be determined by evaluating the temperatures in the two air ducts 1, 2.

Furthermore, a diagnosis can also take place in the case of simultaneous operation of the cylinders 10 and simultaneous heating by the heater 15. During normal operation, the pressure sensors show the same pressure value of the air duct 1 and the air duct 2. If these two pressure values are different, a leakage in one of the two air ducts 1, 2 or in the air filter 31 is presumably the cause. A diagnosis can also be made in this way if the cylinders 10 and the heater 15 are operated together.

What is claimed is:

1. A method of an internal combustion engine system for diagnosing an air supply of an internal combustion engine of the system, the internal combustion engine including a first air duct configured to supply air to a cylinder of the internal combustion engine, and a second air duct configured to supply air to a heater for heating an exhaust gas system of the internal combustion engine, wherein the first air duct has a first mass flow sensor configured to measure a mass of air flowing through the first air duct, the second air duct has a second mass flow sensor configured to measure a mass of air flowing through the second air duct, a first pressure sensor configured to measure a pressure in the first air duct, a second pressure sensor configured to measure a pressure in the second air duct, a first temperature sensor configured to measure a temperature of the air flowing through the first air duct, and a second temperature sensor configured to measure a temperature of the air flowing through the second air duct, wherein the first and the second air ducts originate from a common air filter, the method comprising:

operating, by the internal combustion engine, such that the cylinder and the heater of the internal combustion engine transition into one or more predefined operating states;

monitoring, by a processor of the system, a current state of the cylinder and the heater;

performing, by the processor, a comparison of at least a subset of measurement values of the first and second mass flow sensors, the first and second pressure sensors, and the first and second temperature sensors of the first and second ducts with one another or with predefined comparison values, wherein which of a plurality of predefined comparisons is performed as the comparison depends on to which of the one or more predefined operating states of the cylinder and of the heater the monitoring indicates the current state corresponds; and ascertaining a result of the diagnosis depending on the comparison.

2. The method according to claim 1, wherein:
the first pressure sensor and the second pressure sensor each measures a respective pressure;
respective pressure signals representing the respective pressures are compared with one another; and
when a difference between the respective pressure signals is greater than a threshold value, a leak of the air supply is determined.

3. The method according to claim 1, wherein one of the operating states is realized by opening a throttle valve in the first air duct between: (i) the first mass flow sensor, the first pressure sensor, and the first temperature sensor in the first air duct, and (ii) the cylinder and combustion of fuel in the cylinder.

4. The method according to claim 3, wherein;
during an operation of the internal combustion engine without heating the exhaust gas system, the first pressure sensor of the first air duct and the second pressure sensor of the second air duct each measures a respective pressure signal;
the comparison that is performed includes comparing each of the respective pressure signals with a threshold value that is selected depending on an operating point of the cylinder; and
a leak of the first or second air duct by which the respective air duct is open to ambient air is determined depending on the comparison with the threshold value.

5. The method according to claim 3, wherein:
during an operation of the internal combustion engine without heating the exhaust gas system, a mass flow through the second mass flow sensor in the second duct is measured;
the comparison that is performed includes comparing the measured mass flow through the second mass flow sensor with a threshold value; and
depending on the comparison with the threshold value, a leak of the second air duct by which the second air duct is open to ambient air is determined.

6. The method according to claim 3, wherein:
during an operation of the internal combustion engine without heating the exhaust gas system, respective temperature values of the first and second temperature sensors of the first and second ducts are measured;
the comparison that is performed includes comparing the respective temperature values of the first and second temperature sensors with one another; and
when a result of the comparison is that there is a temperature difference between the respective temperature values of the first and second sensors that is greater than a threshold value, a leak of the second air duct by which the second air duct is open to ambient air is determined.

7. The method according to claim 1, wherein one of the operating states is realized by a heating of the exhaust gas system by activating an air pump, and opening a shut-off valve between: (i) the second mass flow sensor, the second pressure sensor, and the second temperature sensor in the second air duct, and (ii) the heater and combustion of fuel in the heater.

8. The method according to claim 7, wherein;
during a heating of the exhaust gas system without operation of the internal combustion engine, a mass flow is measured by the first air mass sensor in the first duct;
the comparison that is performed includes comparing the measured mass flow in the first duct with a threshold value; and
depending on the comparison of the measured mass flow in the first duct with the threshold value, a leak of the first air duct by which the first duct is open to ambient air is determined.

9. The method according to claim 7, wherein:
during a heating of the exhaust gas system without operation of the internal combustion engine, respective temperature values of the first and second temperature sensors of the first and second ducts, respectively, are is measured;
the comparison that is performed includes comparing the respective temperature values of the first and second temperature sensors with one another; and
when a result of the comparison of the respective temperature values to one another is a temperature difference greater than a threshold value, a leak of the first air duct by which the first air duct is open to ambient air is determined.

10. The method according to claim 1, wherein which one or more of the first and second mass flow sensors, the first and second pressure sensors, and the first and second temperature sensors are used for obtaining the subset of the measurement values depends on to which of the one or more predefined operating states of the cylinder and of the heater the monitoring indicates the current state corresponds.

11. The method according to claim 10, wherein, for a combination of all of the operating states, the measurement values of the first and second mass flow sensors, the first and second pressure sensors, and the first and second temperature sensors are used for respective ones of the plurality of predefined comparisons.

12. An internal combustion engine system comprising:
an internal combustion engine including:
a cylinder;
an exhaust gas system;
a heater;
a first air duct configured to supply air to the cylinder; and
a second air duct configured to supply air to the heater for heating the exhaust gas system of the internal combustion engine; and
a common air filter;
a processor;
wherein:
the first air duct has a first mass flow sensor configured to measure a mass of air flowing through the first air duct, the second air duct has a second mass flow sensor configured to measure a mass of air flowing through the second air duct, a first pressure sensor configured to measure pressure in the first air duct, a second pressure sensor configured to measure pressure in the second air duct, a first temperature sensor configured to measure a temperature of the air flowing through the first air duct, and a second temperature sensor configured to measure a temperature of the air flowing through the second air duct;
the first and the second air ducts originate from the common air filter;
the system is configured to diagnose the internal combustion engine with respect to air supply by performing a method that includes:
operating, by the internal combustion engine, such that the cylinder and the heater of the internal combustion engine transition into one or more predefined operating states;
monitoring, by the processor, a current state of the cylinder and the heater;
performing, by the processor, a comparison of at least a subset of measurement values of the first and second mass flow sensors, the first and second pressure sensors, and the first and second temperature sensors of the first and second ducts with one another or with predefined comparison values; and
ascertaining, by the processor, a result of the diagnosis depending on the comparison; and
which of a plurality of predefined comparisons is performed as the comparison depends on to which of the one or more predefined operating states of the cylinder and of the heater the monitoring indicates the current state corresponds.

* * * * *